United States Patent [19]
Moore

[11] Patent Number: 5,769,474
[45] Date of Patent: Jun. 23, 1998

[54] FLAG INSTALLER APPARATUS FOR UTILITY POLES

[76] Inventor: Danny Moore, 3701 W. 169 St., Country Club Hills, Ill. 60478

[21] Appl. No.: 788,664

[22] Filed: Jan. 24, 1997

[51] Int. Cl.$^6$ ........................................... B25J 1/02
[52] U.S. Cl. ........................ 294/19.1; 116/173; 248/514
[58] Field of Search ............................. 274/19.1, 22, 23, 274/99.1; 40/586, 606, 607, 610, 642.01, 647, 660; 43/21.2; 81/53.1, 53.11, 53.12; 116/173; 248/511, 514, 520

[56] References Cited

U.S. PATENT DOCUMENTS

| | | | |
|---|---|---|---|
| 2,385,820 | 10/1945 | Leibow | 294/19.1 X |
| 2,819,922 | 1/1958 | Panzica | 81/53.11 |
| 3,032,362 | 5/1962 | Lovejoy | 294/19.1 |
| 3,162,409 | 12/1964 | Straayer et al. | 116/173 X |
| 3,304,036 | 2/1967 | Davis | 248/514 |
| 3,342,519 | 9/1967 | Hunt et al. | 81/53.12 |
| 3,824,676 | 7/1974 | Ebert | 294/19.1 X |
| 4,662,305 | 5/1987 | Cline | 116/173 |
| 4,719,826 | 1/1988 | DuBois | 81/53.12 |
| 4,793,646 | 12/1988 | Michaud, Jr. | 294/19.1 |
| 5,065,537 | 11/1991 | Bailey | 40/618 |
| 5,224,745 | 7/1993 | Howell | 294/19.1 |
| 5,379,666 | 1/1995 | Held | 294/19.1 X |

FOREIGN PATENT DOCUMENTS 1273924  9/1961  France  ................................. 294/22

*Primary Examiner*—Johnny D. Cherry
*Attorney, Agent, or Firm*—Henderson & Sturm

[57] ABSTRACT

A flag installer apparatus 10 for installing and removing the flag staff 102 of a flag 104 relative to an elevated angled receptacle 101 affixed to a utility pole 100. The apparatus 10 comprises an extensible pole unit 11 operatively connected to a flag staff capture and release unit 13 by an adjustable connector unit 12.

3 Claims, 2 Drawing Sheets

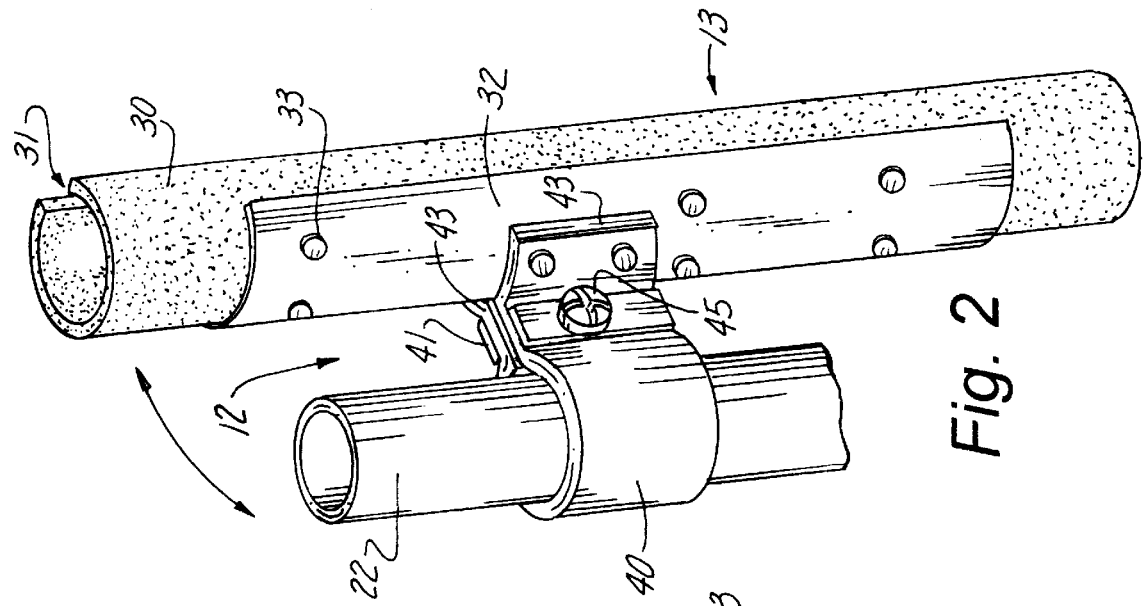
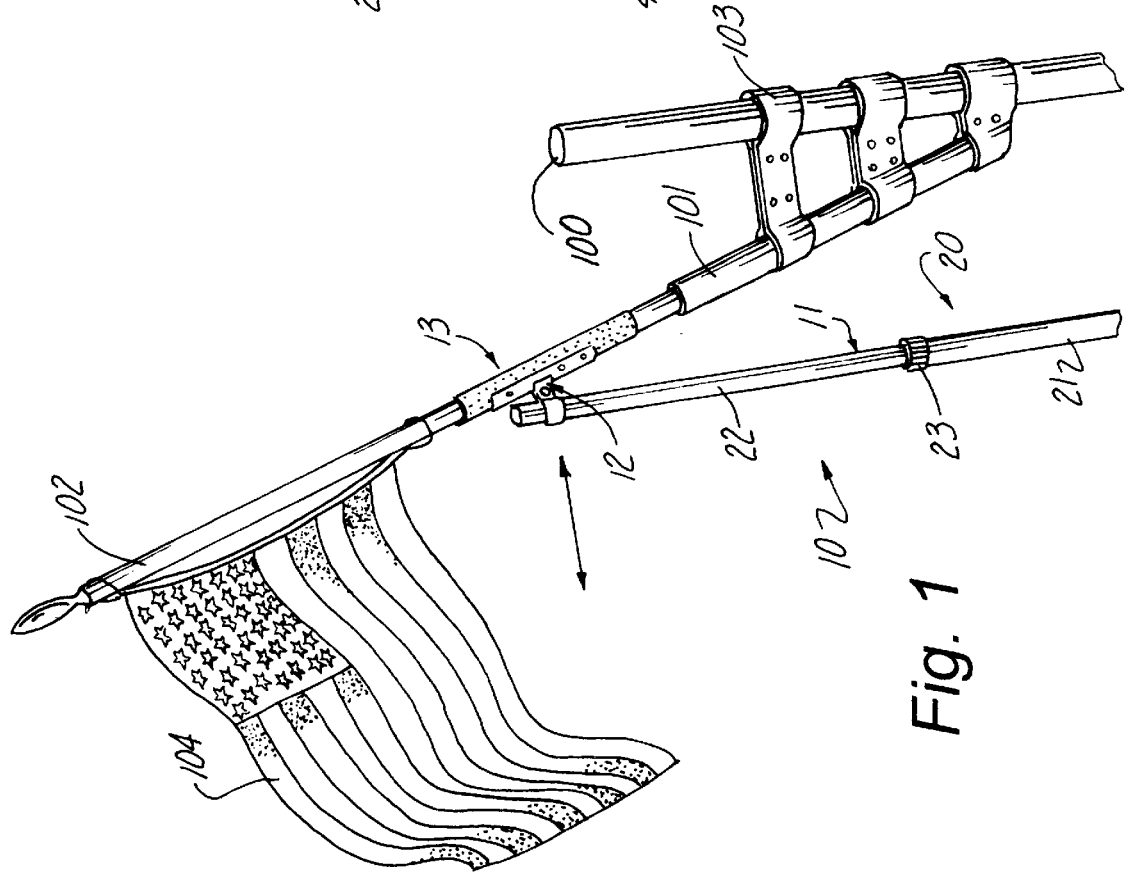

FLAG INSTALLER APPARATUS FOR UTILITY POLES

BACKGROUND OF THE INVENTION

1. Field of the Invention

The present invention relates to the field of extensible handle devices in general, and in particular to a telescoping flag installing device for utility poles.

2. Description of Related Art

As can be seen by reference to the following U.S. Pat. Nos. 4,719,826; 4,793,646; 5,065,537; and 5,224,745 the prior art is replete with myriad and diverse specialized long handled devices used to install a wide variety of disparate articles at elevated locations.

While all of the aforementioned prior art constructions are more than adequate for the basic purpose and function for which they have been specifically designed, they are neither designed nor intended to serve the purpose and function of the present invention which is the quick and easy installation of a plurality of flags on a plurality of utility poles by a single worker.

As most municipal workers are aware, there are many occasions during the course of a year which require the installation of flags on utility poles and this task usually requires the use of either a mechanized cherry picker type vehicle or the old standby conventional ladder which normally involves the need for plural workers.

As a consequence of the foregoing situation, there has existed a longstanding need not only among municipal workers, but also others as well, for a simple and efficient apparatus that can be employed to install a flag at an elevated location on a pole without the need for complex machinery or more than one person and the provision of such a construction is a stated objective of the present invention.

BRIEF SUMMARY OF THE INVENTION

Briefly stated, the flag installer apparatus that forms the basis of the present invention comprises in general, an extensible pole unit, an adjustable pivoted connector unit disposed on the outboard end of the pole unit, and a flag staff capture and release unit operatively associated with the connector unit.

As will be explained in greater detail further on in the specification, the flag staff capture and release unit comprises a resilient tubular member having a longitudinal slit formed along the outboard end such that the walls of the tubular member may be flexed to captively engage and release the periphery of a flag staff.

One connector unit is operatively engaged on one end to the flag staff capture and release unit and on the other end to the pole unit. The intermediate portion of the connector unit is provided with adjustment means for varying the angular orientation of the longitudinal axis of the capture and release unit to the longitudinal axis of the extensible pole unit.

BRIEF DESCRIPTION OF THE SEVERAL VIEW OF THE DRAWING

These and other attributes of the invention will become more clear upon a thorough study of the following description of the best mode for carrying out the invention, particularly when reviewed in conjunction with the drawings, wherein:

FIG. 1 is a perspective view of the flag installer apparatus that forms the basis of the present invention in use;

FIG. 2 is an isolated detail view of the upper portion of the flag installer apparatus.

DETAILED DESCRIPTION OF THE INVENTION

Figure 3:
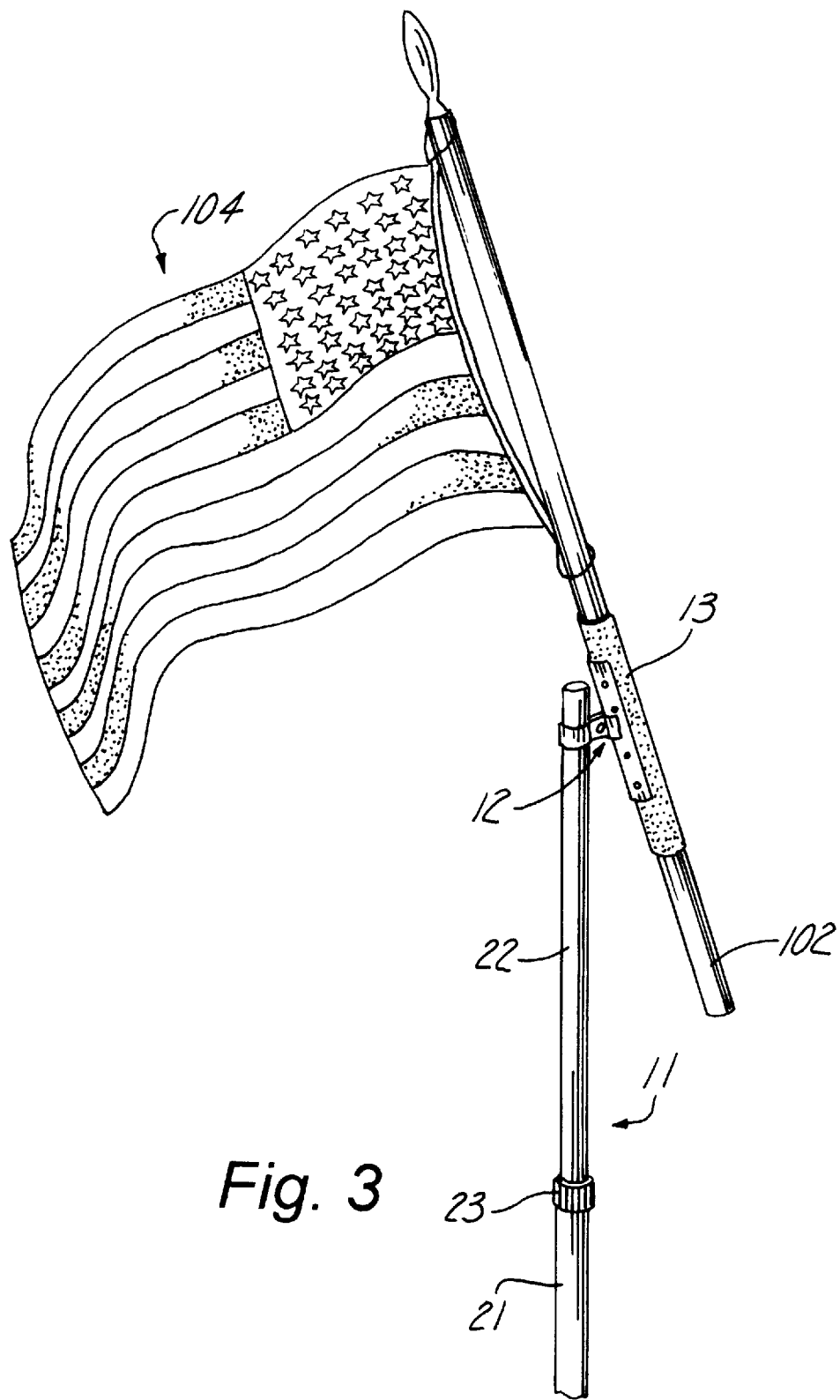
FIG. 3 is a perspective view of the flag installer apparatus engaging the staff of a flag.

As can be seen by reference to the drawings, and in particularly to FIG. 1, the flag installing apparatus that forms the basis of the present invention is designated generally by the reference number 10. The apparatus 10 comprises in general an extensible pole unit 11, and adjustable connector unit 12, and a flag staff capture and release unit 13. These units will presently be described in seriatim fashion.

Prior to embarking on a detailed description of the apparatus 10, it would first be advisable to generally describe the environment in which the apparatus 10 is to be employed. As shown in FIG. 1, this environment involves a utility pole 100 having a tubular receptacle 101 attached thereto in an angular orientation via a stanchion arrangement 103. The tubular receptacle 101 is dimensioned to receive a staff 102 bearing a flag 104.

Still referring to FIG. 1, it can be seen that the extensible pole unit 11 comprises a conventional extensible pole member 20 having an enlarged lower tubular portion 21 dimensioned to telescopically receive a smaller diameter upper tubular portion 22 and releasable securing means 23 for selectively positioning the upper tubular portion 22 relative to the lower tubular portion in a well recognized manner.

Turning now to FIG. 2, it can be seen that the flag staff capture and release unit 13 comprises an elongated length of resilient tubing 30 having a longitudinally extending slit 31 formed on the outer periphery. The inboard portion of the split resilient tubing 30 is fixedly secured to an elongated arcuate stiffening plate 32 via fastening elements 33. The stiffening plate 32 is provided to lend structural rigidity to the inboard portion of the resilient tubing.

Still referring to FIG. 2, it can be seen that the adjustable connector unit 12 comprises an inboard generally C-shaped bracket member 40 operatively engaged to the upper portion 22 of the extensible pole member 20 and having a pair of outwardly projecting apertured arms 41 whose purpose will be explained presently. In addition, the adjustable connector unit 12 further comprises a pair of outboard apertured bracket elements 43 which are fixedly secured on one end to the stiffening plate 32 and wherein the other end is dimensioned to be received within and pivotally secured to the apertured arms 41 of the inboard bracket member 40 via a pivot element 45, such that the angular orientation of the flag staff capture and release unit 13 relative to the extensible pole unit 11 may be varied in a well recognized fashion.

As can best be seen by reference to FIGS. 1 and 3, the flag installing apparatus 10 of the invention is intended to frictionally engage the periphery of a flag staff 102 with the resilient walls of the flag staff capture and release unit 13 by either the vertical or lateral insertion of the flag staff 102 into the interior of the resilient tubing 30. The adjustable connector unit 12 is then manipulated to disposed the capture and release unit 13 relative to the extensible pole unit 11 at a complimentary angle to the angular disposition of the tubular receptacle 101 relative to the utility pole 100.

At this juncture the extensible pole unit 11 is lengthened to position the bottom of the flag staff 102 above the opening in the tubular receptacle 101. The bottom of the flag staff 102 is inserted into the receptacle 101. Once the flag staff 102 is engaged in the receptacle 101, the apparatus 10 is moved laterally away from the utility pole 100 such that the longitudinally extending slit 31 is flexed outwardly to disengage the flag staff 102 from the capture and release unit 13.

Then when it is desired to remove the flag staff 102 from engagement with the receptacle 101 the capture and release unit 13 is brought into engagement with the flag staff 102 such that the longitudinally extending slit 31 will flex inwardly to captively engage the periphery of the flag staff 102. The apparatus 10 will be raised to remove the flag staff 102 from engagement with the receptacle 101.

Having thereby described the subject matter of the present invention, it should be apparent that many substitutions, modifications and variations of the invention are possible in light of the above teachings. It is therefore to be understood that the invention as taught and described herein is only to be limited to the extent of the breadth and scope of the appended claims.

I claim:

1. A flag staff installer apparatus for installing and removing the flag staff of a flag relative to an elevated angled receptacle mounted on a utility pole wherein the apparatus comprises:

an extensible pole unit having a tubular upper portion and a tubular lower portion;

a flag staff capture and release unit pivotally and adjustably associated with the upper portion of said pole unit wherein the capture and release unit comprises in part an elongated length of resilient tubing having a longitudinally extending slit formed on the outer periphery of the resilient tubing wherein said length of resilient tubing is dimensioned to frictionally engage the periphery of the flag staff; and an adjustable connector unit disposed intermediate the extensible pole unit and the flag staff capture and release unit wherein the adjustable connector unit comprises:

a generally C-shaped bracket operatively engaged to the upper portion of the extensible pole unit; and at least one bracket element operatively connected on one end to the resilient tubing and pivotally connected on the other end to said C-shaped bracket via a pivot element.

2. The flag installer apparatus as in claim 1 wherein said at least one bracket element is operatively connected to said resilient tubing via an elongated stiffening plate.

3. A flag staff apparatus for installing and removing the flag staff of a flag relative to an elevated angled receptacle mounted on a utility pole wherein the apparatus comprises:

an extensible pole unit having a tubular upper portion and a tubular lower portion;

a flag staff capture and release unit pivotally and adjustably associated with the upper portion of said pole unit wherein the capture and release unit comprises in part an elongated length of resilient tubing having a longitudinally extending slit formed on the outer periphery of the resilient tubing wherein said length of resilient tubing is dimensioned to frictionally engage the periphery of the flag staff; and an adjustable connector unit disposed intermediate the extensible pole unit and the flag staff capture and release unit wherein the adjustable connector unit comprises:

an elongated stiffening plate affixed to the periphery of said resilient tubing; a pair of apertured bracket elements affixed to said stiffening plate;

a generally C-shaped bracket operatively engaged with the upper portion of the extensible pole unit; and adjustable pivot means operatively associated with said generally C-shaped bracket and said pair of apertured bracket elements for varying the angular orientation of the stiffening plate relative to the longitudinal axis of the extensible pole unit.

* * * * *